United States Patent [19]

Feuser

[11] Patent Number: 4,901,624
[45] Date of Patent: Feb. 20, 1990

[54] HYDRAULIC DRIVING DEVICE

[75] Inventor: Alfred Feuser, Lohr-Rodenbach, Fed. Rep. of Germany

[73] Assignee: Mannesmann Rexroth GmbH, Lohr, Fed. Rep. of Germany

[21] Appl. No.: 201,777

[22] Filed: Jun. 20, 1988

Related U.S. Application Data

[63] Continuation of Ser. No. 907,676, Sep. 15, 1986, abandoned.

[30] Foreign Application Priority Data

Sep. 14, 1985 [DE] Fed. Rep. of Germany ...................... 3532931.1014

[51] Int. Cl.⁴ ............................................ F15B 21/02
[52] U.S. Cl. ....................................... 91/35; 91/363 R
[58] Field of Search ......................... 91/363 R, 364, 35

[56] References Cited

U.S. PATENT DOCUMENTS

| | | | |
|---|---|---|---|
| 3,958,492 | 5/1976 | Curless | 91/363 R |
| 4,164,167 | 8/1979 | Imai et al. | 91/363 R |
| 4,218,956 | 8/1980 | Uno et al. | 91/363 R |
| 4,450,753 | 5/1984 | Basrai et al. | 91/35 |

Primary Examiner—A. Michael Chambers

[57] ABSTRACT

A hydraulic driving device includes a working cylinder for moving a machine component, and an electro-hydraulic servo system. The servo system includes a servo-valve, a position-error control, a circuit for emulating speed and acceleration of the working cylinder, and a regulator for weighting the ascertained position error according to the emulated speed and acceleration, and generating a setting signal for the servo valve.

6 Claims, 9 Drawing Sheets

HYDRAULIC DRIVING DEVICE

This is a continuation of application Ser. No. 907,676, filed Sept. 15, 1986, now abandoned.

BACKGROUND OF THE INVENTION

The present invention relates to a hydraulic driving device which includes a hydraulic pressure medium source, an electrically controlled control valve with an electric feedback of its opening cross-section, and a hydraulic motor for moving a machine component.

Known hydraulic drives of the foregoing type are not sufficient for attaining highly precise and dynamic positioning tasks. The reason resides in a relatively low realizable circuit amplification for this drive due to its low intrinsic damping. The integrating component of the speed regulation circuit must be reduced on stability grounds. Furthermore, due to hysteresis, so-called limiting cycles, which are not acceptable, are formed in the servovalve or proportional valve.

SUMMARY OF THE INVENTION

It is an object of the present invention to provide an improved hydraulic driving device.

In particular, it is an object of the present invention to provide a hydraulic drive which achieves a high positioning accuracy with high load stability and higher displacement speeds for a movable machine component whereby the regulator, as compared to customary regulation devices, would permit the reduction of the piston surface and also reduction of the pump aggregate including the control valve.

These and other objects of the invention are attained by a hydraulic driving device, comprising:

(a) a hydraulic pressure medium source;
(b) an electrically controlled control valve with an electrical feedback of its opening cross-section;
(c) a hydraulic motor for moving a machine component,
(d) a feedback control for determining a displacement error of the machine component;
(e) an intrinsic oscillation emulator for generating signals corresponding to estimate acceleration and speed of displacement of the motor and the machine component;
(f) a regulation electronics for weighting a displacement error signal according to the estimate acceleration and speed signals, and generating a setting signal for the control valve.

The control for determining a displacement error is programmable.

The regulation electronics may be formed as a PDT$_1$-regulator.

The hydraulic motor may be formed as a working cylinder; a regulation amplifying may be adjustable in dependence upon a stroke of the working cylinder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2b is a schematic diagram of a weighting regulator in the circuit of FIG. 2a;

FIG. 2c shows in greater detail the first embodiment of the circuit of FIG. 2a;

FIG. 7 is a circuit diagram of a further embodiment of a modification of the embodiment of FIG. 2a; and;

DESCRIPTION OF THE PREFERRED EMBODIMENTS

Figure 1:
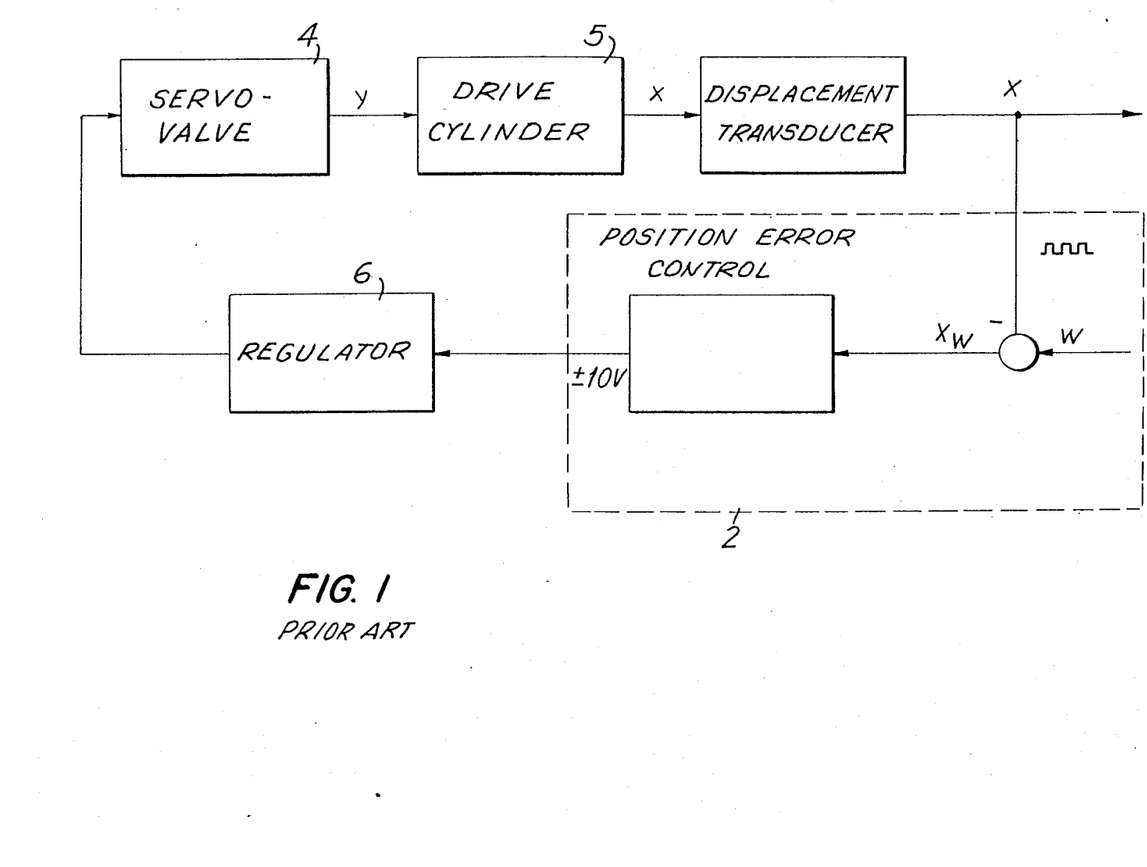
FIG. 1 schematically shows a prior art hydraulic drive having an electrohydraulic servo-system.

FIG. 1 shows a prior art hydraulic drive which is comprised of a servovalve or proportional valve 4, a hydraulic cylinder (synchronous or differential cylinder) 5, an incremental displacement pickup or transducer 18, a customary control 2 to which the actual displacement signal X and a desired displacement signal W are supplied, and at the output of which an analogous position error signal $X_W$ is produced, and a regulating electronics 6 which processes the output signal of the control 2 and generates an adjustment or setting signal for the servovalve 4.

FIGS. 2a, 2c, 4, 7 and 8 illustrate the regulating electronics 6 of this invention in connection with a conventional position error control 2 in different structures which have in common a combination of a weighting regulator 6a or 7a with a displacement condition or intrinsic oscillations emulator 6b or 7b.

The theory of the linear condition control enables the determination of the dynamic reaction of the closed regulating circuit. This assumption is based on the knowledge and use of the condition values of the displacement, namely the position speed, and acceleration values of the movable machine component, such as for example a slide carriage of the machine tool. Beside the measured position X of the carriage the additional acceleration W and speed X values are not available by usual measuring techniques.

Figure 2A:
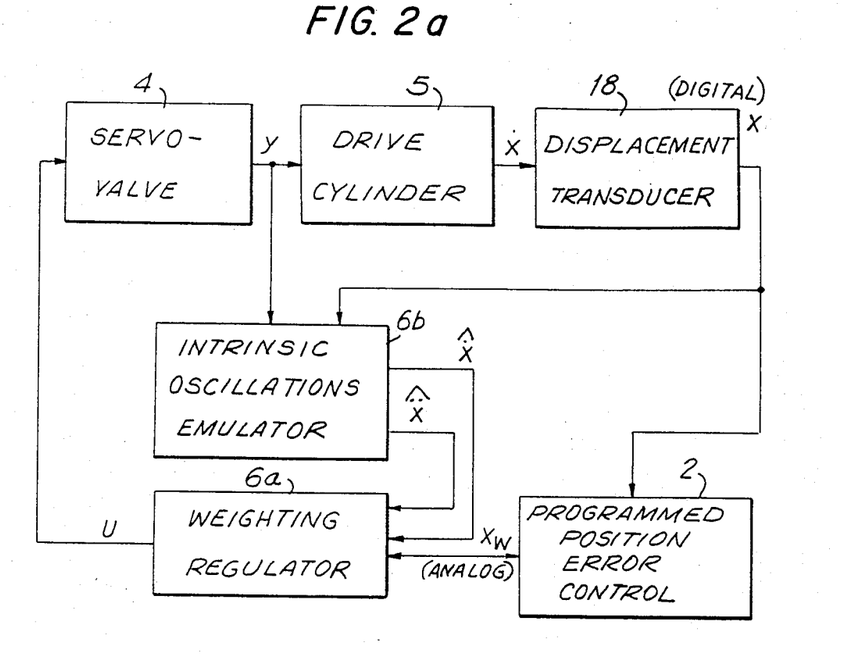
FIG. 2a is a schematic block diagram of the servo-system of this invention.
Figure 2B:
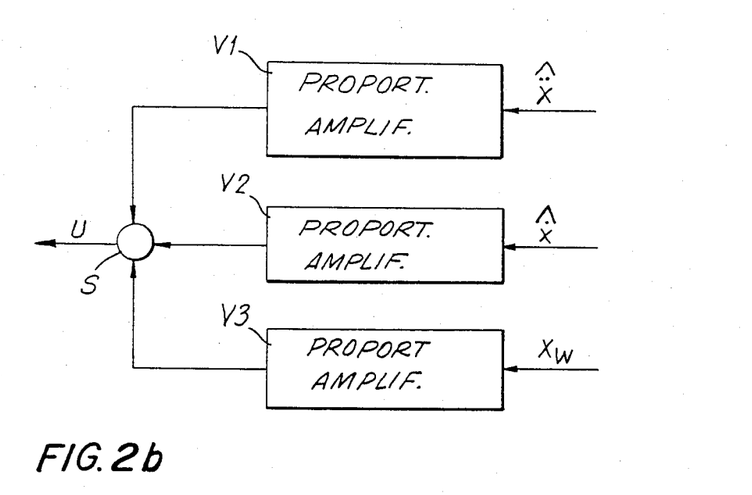
Figure 2C:
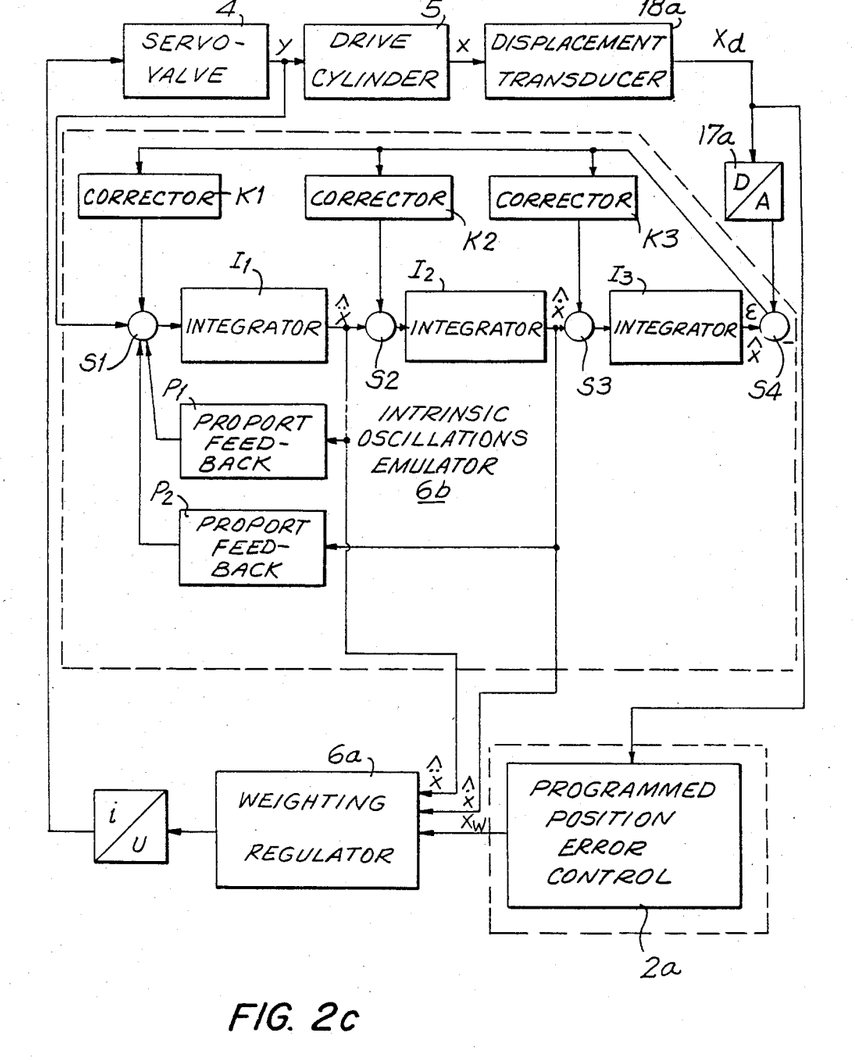

An electronic circuit is shown in FIG. 2c, which can estimate these unknown speed and acceleration values, $\dot{X}$, $\ddot{X}$. The analogous value X of the position is produced by a D/A converter 7 and is supplied to the electronic circuit for the comparison of the measured position X with the estimated position $\hat{X}$. The above mentioned determination of the dynamic reaction is herein utilized in that the amplifying factors of the control ensure that the transfer behavior of the drive takes place fast and without deviations. In addition the amplification of the position feedback is also maximally adjusted to enhance precision. This is possible due to the utilization of the acceleration value $\ddot{X}$ and speed value $\dot{X}$ in control algorithms.

The displacement condition emulator 6b dynamically emulates the intrinsic oscillations of the hydraulic motor (drive cylinder 5). As is known, the drive cylinder can be represented as a spring-mass system up to a speed X with a subsequent integration up to a position X which can be described in the form of a mathematical model. From the model a differential equation of the third order results which can be emulated by a circuit including three integrators $I_1$, $I_2$, $I_3$ and two proportional feedback stages $P_1$, $P_2$. From this circuit, the speed value X and the acceleration value X which are required for the regulation, can be derived or estimated.

The correcting circuits $K_1$, $K_2$, $K_3$ proportionally amplify a difference $\epsilon$ between the actual displacement or position X and the estimated position X resulting at the output of integrator $I_3$, thus providing an optimum agreement between the actual and estimated speed and acceleration values. The weighting regulator 6a weights the feedbacks of the regulating loop to generate a setting value for the control valve. As shown in FIG. 2b, the output value $X_W$ of the position error control and the speed and acceleration values estimated by the intrinsic oscillations emulator are proportionally amplified in amplifiers $V_1$, $V_2$, $V_3$ and combined with each other in a summer S to generate a setting signal V for the control valve 4.

Figure 3:
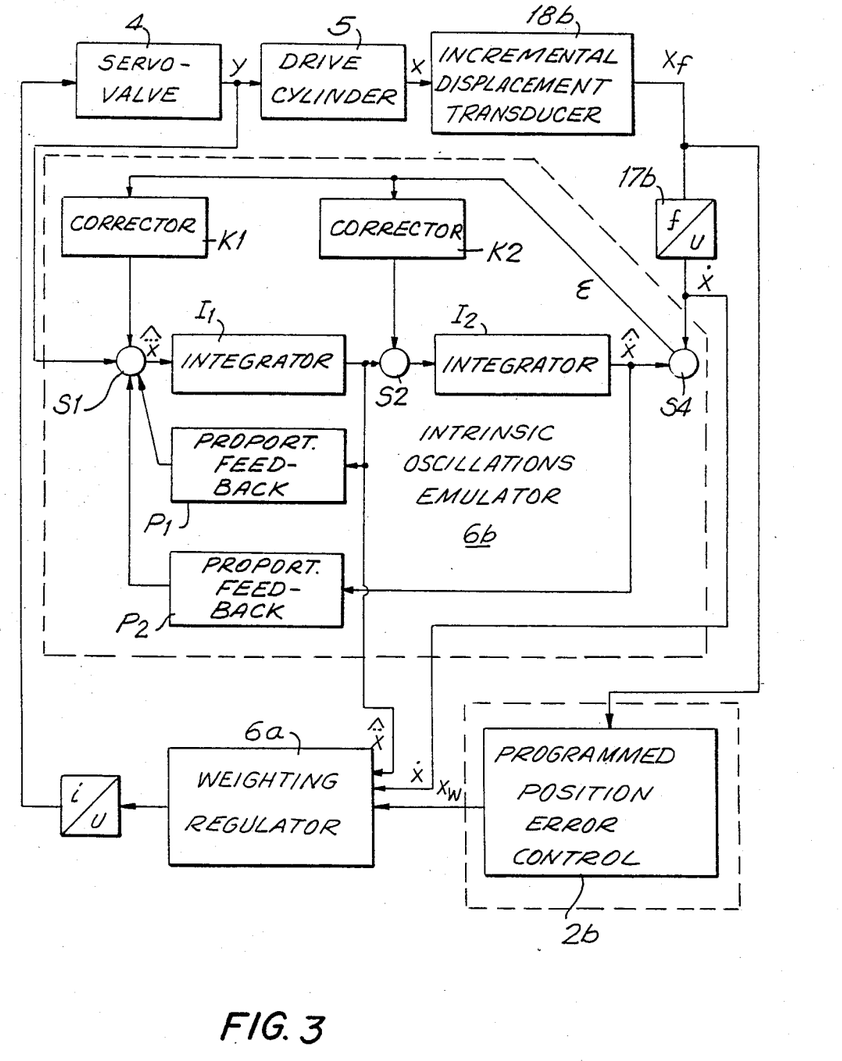
FIG. 3 is a schematic block diagram of the second embodiment of the invention.

The structure of the electronics shown in FIG. 3 includes a control 2b, a condition weighting regulator 6a and a reduced estimation electronics or intrinsic oscillations emulator 6b for the condition values. The embodiment of FIG. 3 enables the bringing in of the measured actual speed X of the slide carriage through the conversion of the impulse note of the incremental displacement signal $X_f$ with the aid of a frequency-voltage (f/U) converter 17b. The estimation electronics for the condition values is minimized due to the fact that only the acceleration value $\ddot{X}$ is utilized as an estimation value for the control feedback. The correction members $K_1$, $K_2$ proportionally amplify the difference $\epsilon$ between the measured $\dot{X}$ and estimated $\dot{X}$ speeds.

The advantage of this reduced construction of the emulator 6b is in that due to the missing third integrator $I_3$, the amplification factors of the correctors $K_1$, $K_2$ may be increased and the dynamic quality of the emulator is improved.

Figure 4:
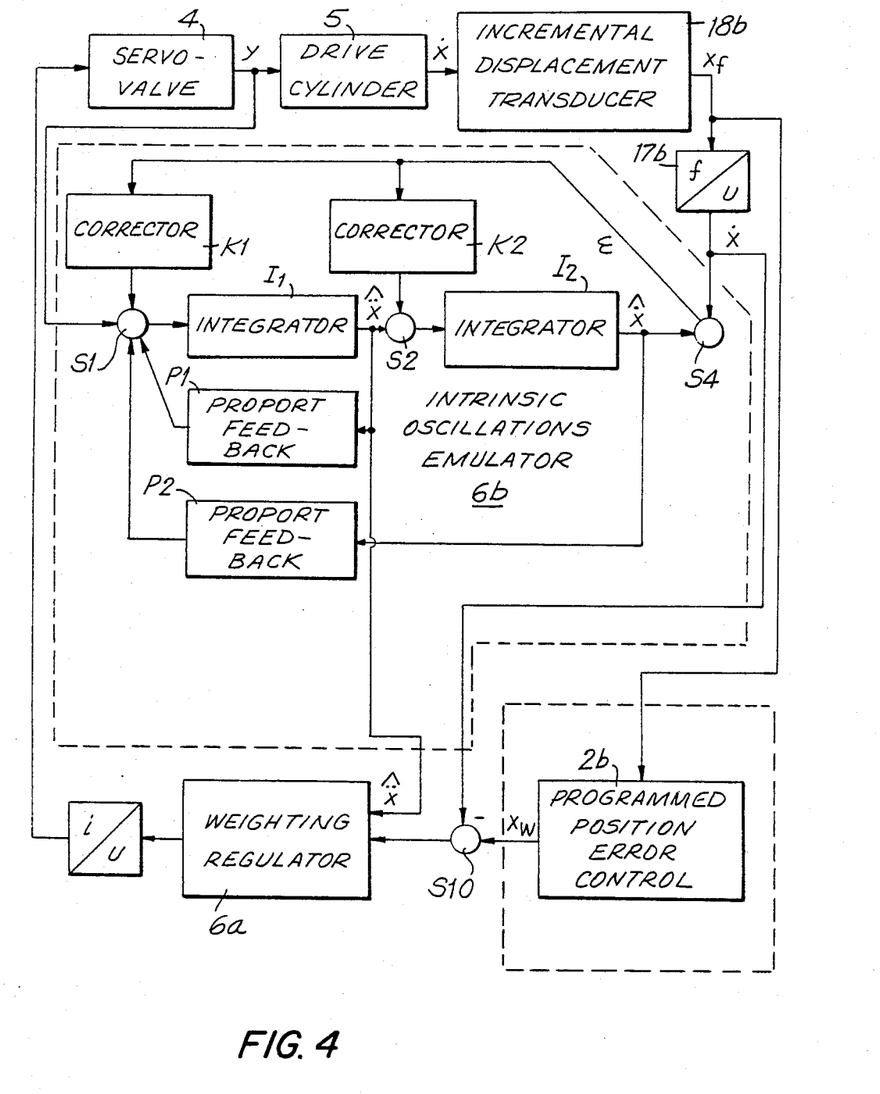
FIG. 4 is a diagram diagram of the third embodiment of the invention.

FIG. 4 shows the electronics which is comprised of the control 2b, reduced estimation or emulation electronics 6b and the weighting regulation circuit 6a. The amplified output signal $X_W$ of the control 2b and the actual speed signal X from converter 17b are fed to summation circuit 10. The output signal of the summation member 10 is fed to one input of the regulation circuit 6b. The other input of circuit 6b is supplied with the acceleration signal X from the estimation electronics 6b. The structure of the estimation electronics 6b is here the same as that shown in FIG. 3.

Figure 5:
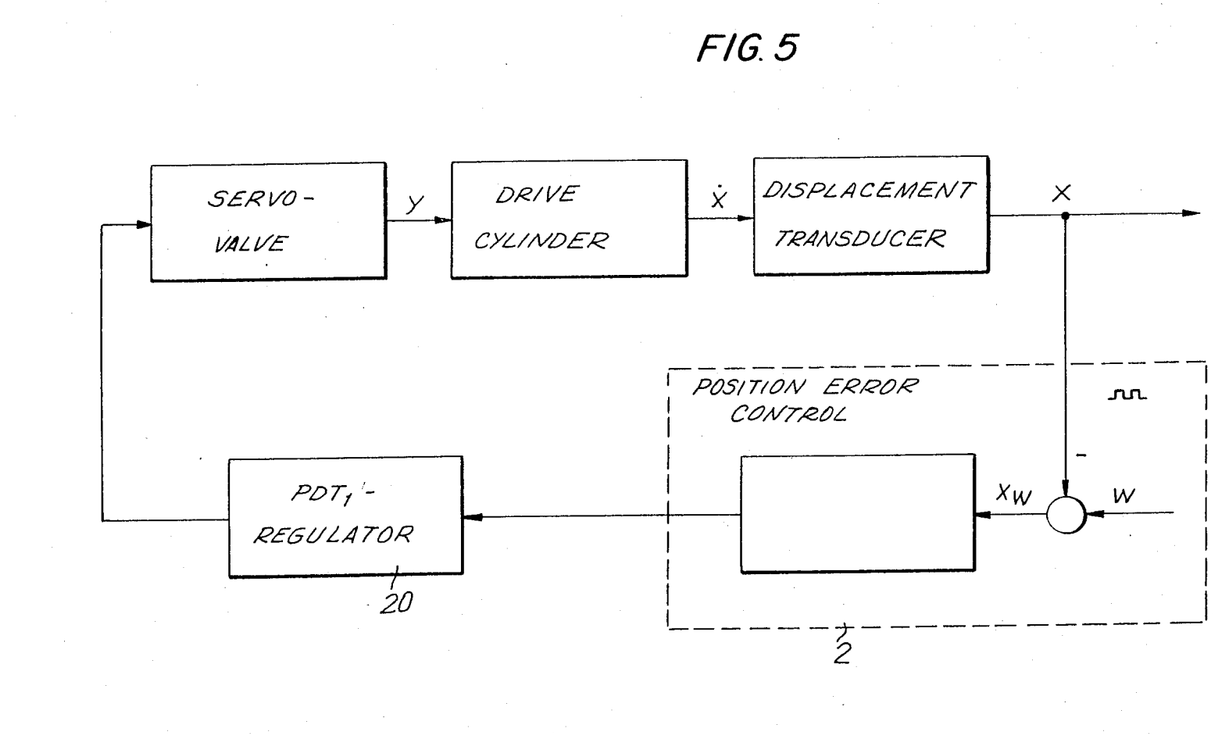
FIG. 5 is a schematic block diagram a prior art circuit of a prior art servo-system using a PTD$_1$-regulator.

FIG. 5 shows a prior art regulation circuit with a standard $PDT_1$ regulator. The control circuit of FIG. 5 is different from those shown in FIGS. 2a, 2c, 3 and 4. Here the weighting regulator with the acceleration-and-speed feedback of the structure shown in FIGS. 2a to 4 is not provided; instead a combination of the so-called classical regulator, which regulates exclusively the difference Xw at the output of the control.

The regulator 20 which processes the signal $X_W$, is comprised of a proportion component, a differentiating component, and a delay component.

The values for the corresponding structural components of the regulator 20 are as follows:
(a) VR-amplifying factor for the proportion component;
(b) Tv-rate time constant for the differentiating component; and
(c) T-delay time constant for the delay component.

These values must be adjusted in accordance with the dynamic conditions of the control valve (servovalve or proportion valve) and the drive (cylinder). The regulation theory offers together with the method of the polar frequency response locus of roots, the possibility that the above mentioned factors can be adjusted for an optimal transition.

The selection between the weighting regulator and the standard or classical regulator depends on intrinsic frequency ratios between the control valve ($W_{OV}$) and the cylinder drive ($W_{OZ}$).

For the ratio Wov/Woz=0.3 ... 1.5, the classical regulator can be utilized.

For the ratio Woz/Wz=1.5 ..., the utilization of the weighting regulator has particular advantages in view of the increase in the circuit amplifying and thus in the position accuracy and load stability.

Figure 6:
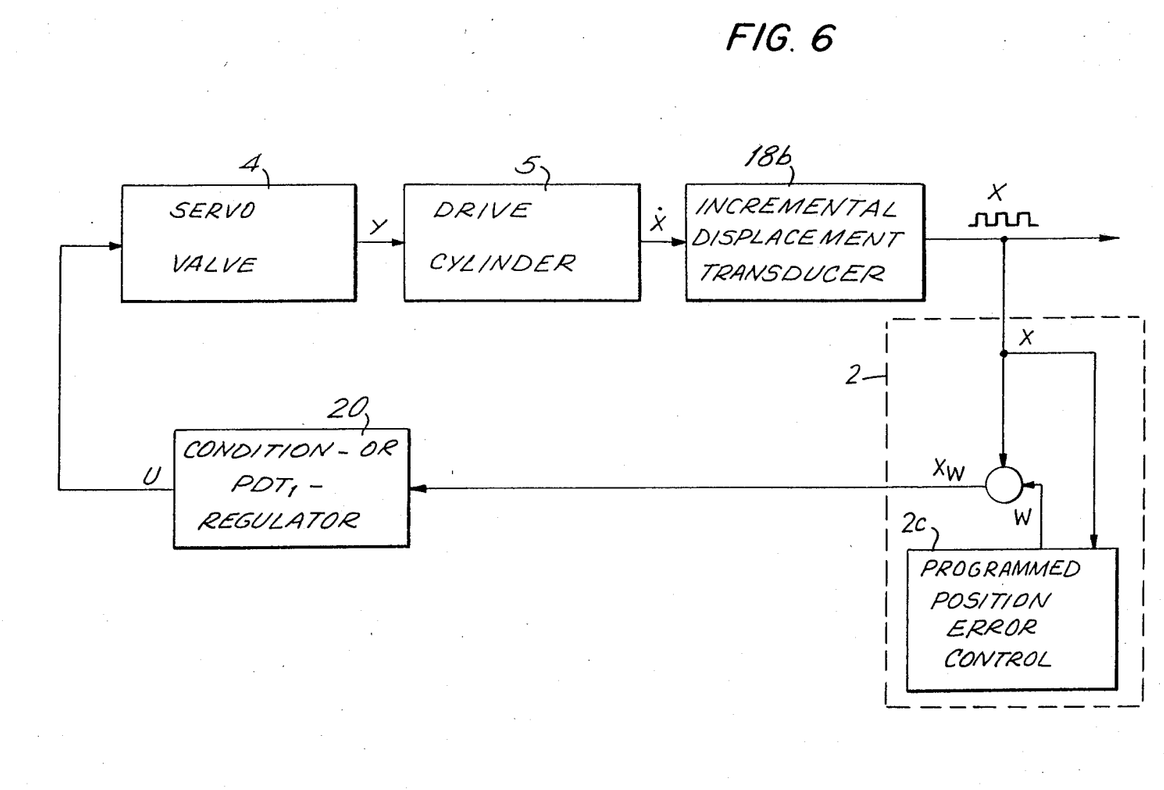
FIG. 6 is a block diagram of the electronics servo-system of FIG. 5 modified according to the invention of the digital control and regulation separation circit.

From the theory of the incremented or sampling regulation it has been known that the time of sampling has influence on the quality of regulation. The feedback control operates as a sampler which samples the displacement value $X_f$ in time steps or increment $\Delta t$. The displacement value is processed by an analogous step-function program, and a resulting position error signal is delivered to the analogous summation point. Within each time interval $\Delta t$, the regulation is turned off. For fast hydraulic drives, the sampling time of, for example 4 ms brings the problem that the amplification of the regulation circuit must be reduced. In order to avoid this, the separation between the digital control 2c and the regulation 6 must take place. Such a structure is shown in FIG. 6.

The analog position error value $X_W$ is supplied from control 2c to the regulation circuit 20. The latter permanently processes this analog value and can maintain its optimal circuit amplification. The control 2c compares actual value of each increment X with a desired value W, an operation cycle value and, for the correction, computes the analog position error value $X_W$.

The regulator 20 is formed either as a position regulator or $PDT_1$-regulator.

If the regulator is designed in accordance with the criteria of the sampling regulation in Z-range, it can be realized also in the digital technique (microprocessor) because the above described effects of the reduction of the amplification do not occur.

Figure 7:
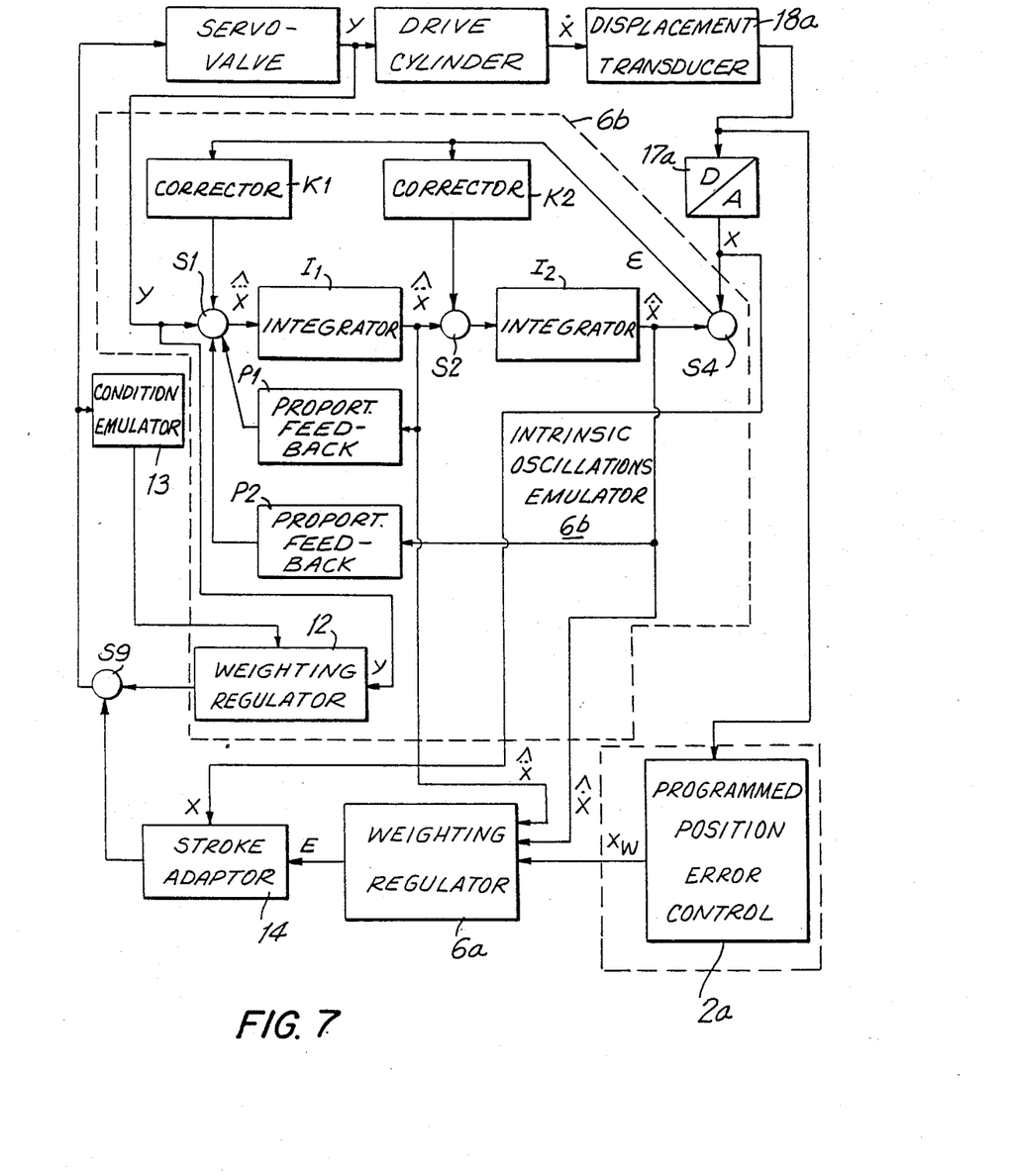

The structure depicted in FIG. 7 similar to that of FIG. 2, whereby the control valve 4 is formed as a servo-valve and has its own weighting regulator 12, and its own condition emulator 13. The condition emulator 13 is formed as a parallel dynamic model without correcting components. The intrinsic oscillations frequency and damping factor of the servovalve in the predetermined range will be favorably affected. Due to a higher circuit amplification the hysteresis will be reduced, and the response characteristics of the system will be improved, that are static characteristics.

An adaptation member 14 in FIG. 7 is connected to the output of condition regulator 6a, and the output signal E of the regulator can be changed by the adaptation member 14 in dependency on the stroke X of the cylinder so that the amplification of the main regulation circuit is being adjusted over the entire stroke of the hydromotor.

The intrinsic oscillations frequency of the drive cylinder depends on the stroke and, consequently, the circuit amplification is changed in response to the stroke. The stroke adaptation member 14 consists of a multiplier circuit for the input values E and X.

Figure 8:
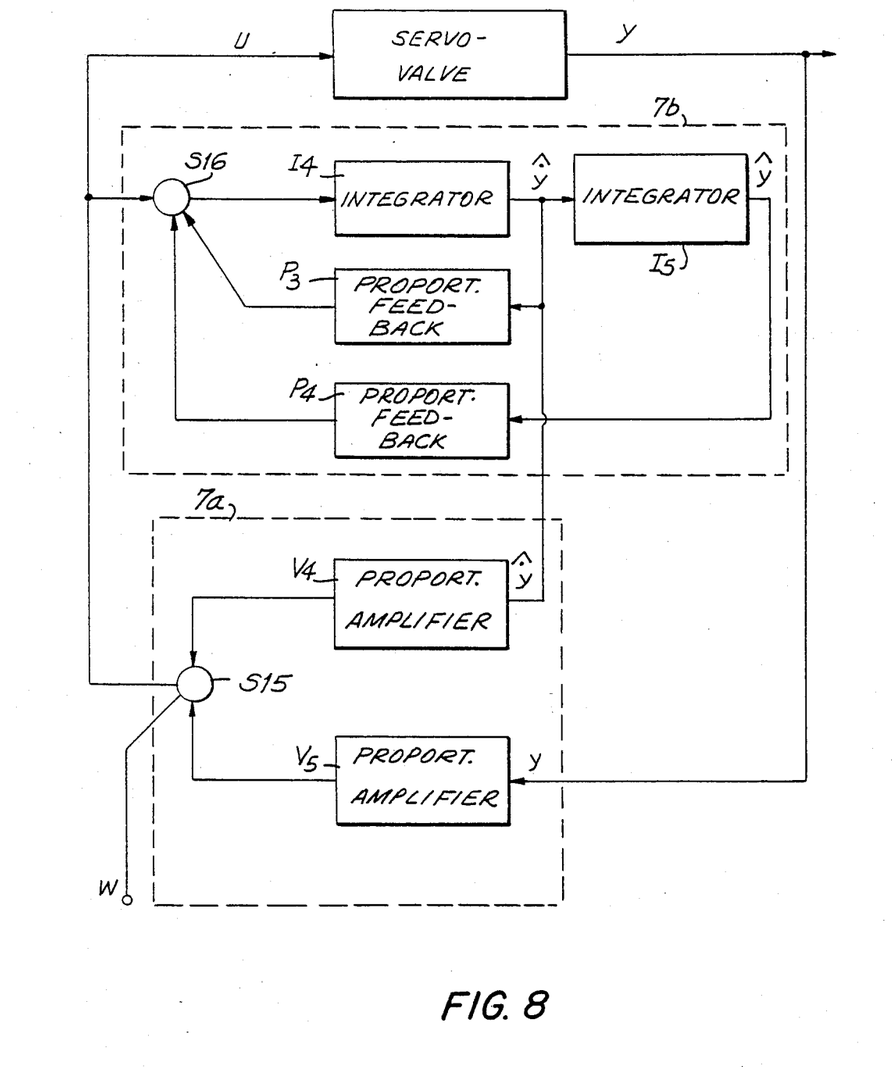
FIG. 8 shows in greater detail of the circuit diagram of FIG. 7.

The servo-valve control circuit of FIG. 8 shows a weighting regulator 7a and a condition emulator 7b corresponding, respectively, to blocks 12 and 13 in FIG. 7. The integrators I4 and I5 together with proportional feedbacks P3 and P4 form a dynamic model for emulating the speed (y) and the position (y) of the sliding spool of the servo valve. The weighting regulator 7a proportionally amplifies the feedback signals y and y and feeds the amplified output signals $V_4$, $V_5$ to a summation amplifier $S_{15}$. The output signal U of the summation amplifier 15 is applied to a summation amplifier $S_{16}$ of the condition emulator 7b and to the control input of the servo valve.

The hydraulic drive device can be formed not only as a drive cylinder but also as a hydraulic rotation drive. The rotation drive can be in the form of the angular position regulation system or r.p.m. regulation circuit.

It will be understood that each of the elements described above, or two or more together, may also find a useful application in other types of hydraulic drives differing from the types described above.

While the invention has been illustrated and described as embodied in a hydraulic drive it is not intended to be limited to the details shown, since various modification and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic driving device including a hydraulic motor and an electro-hydraulic servo system for controlling the displacement of said hydraulic motor, said servo system comprising an electrically controlled control valve connected to a hydraulic pressure circuit of said hydraulic motor; a transducer coupled to a driven member of said hydraulic motor to generate an actual displacement signal; means for comparing the actual displacement signal with a desired displacement signal and generating a position error signal; means for electrically emulating intrinsic oscillations of said hydraulic motor and generating an estimate acceleration signal and an estimate speed signal; and a regulator having inputs connected to said emulating means and an output connected to an electrical control input of said control valve, said regulator weighting said position error signal according to said estimate signals and generating a weighted setting signal for said control valve; said transducer generating a digital actual displacement signal, and said comparing means including a computer programmed for comparing said digital actual displacement signal with a desired displacement value and delivering at its output an analog position error signal.

2. A hydraulic driving device as defined in claim 1, further comprising means for converting said digital actual displacement signal into an analog actual displacement signal; said emulating means further generating an estimate displacement signal; means for comparing said analog actual displacement signal with said estimate displacement signal and applying the resulting difference signal to said emulating means to correct said estimate acceleration and speed signals.

3. A hydraulic driving device as defined in claim 1 wherein said transducer generates an incremental actual displacement signal, and said comparing means including a computer programmed for converting said incremental actual displacement signal into an analog position error signal.

4. A hydraulic driving device as defined in claim 3, further comprising means for converting said incremental actual displacement signal into an actual speed signal; means for comparing said actual speed signal with said estimate speed signal and applying the resulting difference signal to said emulating means to correct said estimate acceleration and speed signals.

5. A hydraulic driving device as defined in claim 4, further comprising means for comparing said position error signal with said actual speed signal, said regulator having an input connected to said emulating means to receive said estimate acceleration signal, and another input connected to said position error signal comparing means to receive the resulting difference signal.

6. A hydraulic driving device as defined in claim 2, further comprising a condition detector for electrically emulating intrinsic oscillations of said control valve, an additional weighting regulator having an input for receiving an output signal from said condition detector, another input for receiving a displacement signal from said control valve, and an output for delivering a difference signal; a stroke adaptor for weighting the output signal from said first mentioned regulator according to said actual position displacement signal, and delivering an adapted setting signal; means for comparing the adapted setting signal with the difference signal from the additional weighting regulator, and applying the resulting difference signal to an electrical control input of said control valve.

* * * * *